Figure 1:
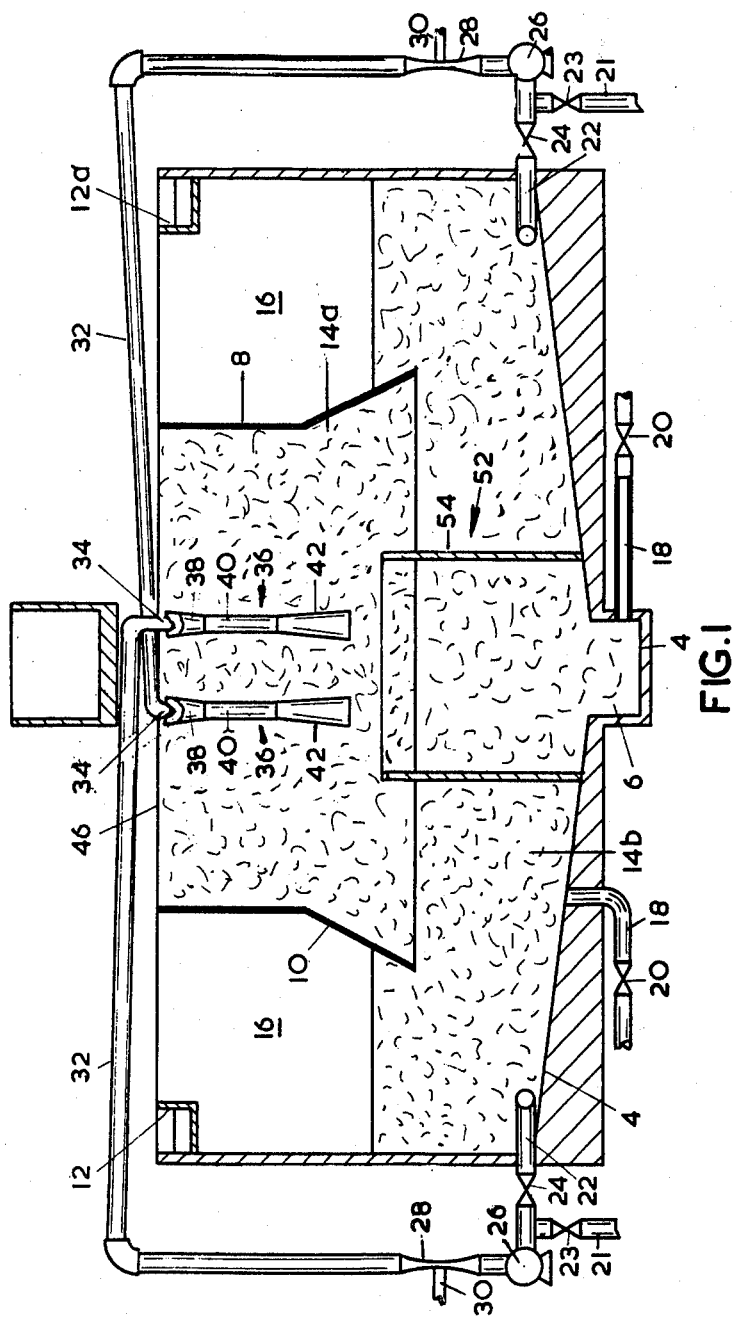

United States Patent [19]

Garrett et al.

[11] 4,452,701

[45] Jun. 5, 1984

[54] BIOLOGICAL TREATMENT OF SEWAGE

[76] Inventors: Michael E. Garrett, 92 York Rd., Woking, Surrey; Oliver A. Kite, 22 Hayes Close, West Wickham, Kent, both of England

[21] Appl. No.: 439,499

[22] Filed: Nov. 4, 1982

[51] Int. Cl.³ ............................................. C02F 3/20
[52] U.S. Cl. .................................... 210/627; 210/197; 210/220
[58] Field of Search ............... 210/623, 625, 626–629, 210/194, 197, 621, 198.1, 220, 221.1, 221.2, 207, 622; 261/123, DIG. 75, 29, 36 R, 77, DIG. 70

[56] References Cited

U.S. PATENT DOCUMENTS

| 3,606,985 | 9/1971 | Reed | 261/123 |
|---|---|---|---|
| 4,045,336 | 8/1977 | Isteri | 210/629 |
| 4,071,443 | 1/1978 | Gorski et al. | 210/627 |
| 4,192,740 | 3/1980 | Savard et al. | 261/93 |
| 4,324,657 | 4/1982 | Garrett | 210/220 |
| 4,347,143 | 8/1982 | Righetti | 210/194 |

Primary Examiner—Benoît Castel
Attorney, Agent, or Firm—David L. Rae; Larry R. Cassett

[57] ABSTRACT

Sewage is oxygenated and clarified in a tank having an open-bottomed stilling chamber located above an open-topped chamber. Oxygenated sewage is discharged into the stilling chamber where its velocity is reduced, with sewage passing from the stilling chamber into the open-topped chamber being precluded from flowing horizontally along the tank bottom, and upwardly into the clarified sewage.

2 Claims, 2 Drawing Figures

BIOLOGICAL TREATMENT OF SEWAGE

This invention relates to a method and apparatus for treating sewage or other aqueous effluent or waste having a biochemical oxygen demand.

Traditionally, sewage has been treated by aerobic micro-organisms that break down offensive substances. In order to provide the micro-organisms with oxygen essential for their respiration, the sewage is aerated. A typical sewage treatment process includes the stage in which the sewage is aerated and contacted with "activated sludge" containing the necessary aerobic micro-organisms and a subsequent stage in which the treated sewage is allowed to settle into two layers, one being of clear, treated water, the other containing the activated sludge. Pure water is run-off from the upper layer. Typically, in the treatment of municipal sewage, there is also a preliminary settling stage in which coarse solids are removed before the activated sludge treatment is carried out. Since the sewage is agitated to help dissolve air therein, the activated sludge and settling stages are conventionally performed in separate vessels.

It has been proposed, for example, in our UK complete specification Nos. 1,596,311 and 1,602,832 to perform the bacterial or activated sludge treatment of oxygenated sewage in the same vessel as the clarification of the sewage. This therefore makes possible a reduction in the number of tanks required for the treatment of the sewage and therefore makes the process attractive to owners of industrial plant producing sewage or aqueous effluent having a biochemical oxygen demand.

Our copending U.S. application Ser. No. 439,498, filed on even date herewith, and entitled 'Dissolving gas in a liquid' provides a method for dissolving gas in a body of liquid in which the gas is sparingly soluble, comprising the steps of: withdrawing a stream of liquid from the said body of liquid, pressurising the stream, introducing oxygen into the pressurised stream such that only a portion of the oxygen dissolves, the undissolved oxygen being carried in the stream in the form of bubbles, introducing said stream as a jet into an open-ended chamber, said chamber being submerged within the body of liquid, said stream inducing flow of liquid from outside the chamber into said chamber, the stream and the liquid induced into the chamber becoming mixed and the resulting flow of mixed liquid being reduced in velocity upstream of its discharge from the outlet of the chamber.

The aforesaid copending application also provides apparatus for performing the above method, comprising: means for withdrawing and pressurising a stream of liquid from a vessel containing a body of liquid, means for introducing gas into said stream, an open-ended chamber situated in said vessel and able to be immersed in the liquid, at least one nozzle whose outlet is situated near to or within the chamber and which communicates with the outlet end of said pumping means, the chamber having an upstream portion for inducing flow of liquid from within the vessel and outside the chamber into the chamber, an intermediate mixing portion and a downstream decelerating portion.

The method and apparatus according to the aforesaid copending application are particularly suitable for use in the oxygenation of sewage in a sewage treatement process of the kind in which bacterial or activated sludge treatment of the sewage takes place in the same vessel as clarification of the sewage.

In such a process the chamber is preferably located within a volume of suspended activated sludge (or the like), typically in an upper portion of the vessel kept separate from the clear liquid therein by a stilling box or suitable arrangement of baffles, or both.

Typically, turbulence created in the chamber by introducing the jet of liquid into such chamber reduces the size of the undissolved bubbles of gas and thereby facilitates dissolution of the bubbles in the liquid. Typically, however, not all the gas is dissolved immediately. It is not necessary to dissolve all the gas in the chamber. Indeed, with the chamber generally vertically located, with its outlet below its inlet, the velocity of the liquid leaving the chamber may be arranged to be greater than the terminal rise velocity of the bubbles such that some bubbles will be swept out of the chamber with the liquid leaving it. Although it has previously been thought that such discharge of bubbles of undissolved gas can adversely affect a sewage treatment process in which clarification and biological treatment take place in the same vessel, we believe that we can avoid any substantial deleterious effect by preventing substantially all such bubbles entering the clear liquid. In order to achieve this end, we prefer to employ a baffle or baffles to help guide rising bubbles of gas away from the clear liquid.

We have found that in 'single tank' sewage treatment processes in which clarification and biological treatment take place in the same vessel, particularly such processes employing the method and apparatus according to our copending application, there is a tendency for at least a small part of the oxygenated stream of liquid introduced into the stilling chamber to be deflected laterally from the bottom of the vessel into a region where clarification takes place. Even relatively small amounts of turbulence can disturb clarification and cause small quantities of suspending solids to enter the clear liquid thereby causing localised cloudiness in such liquid. Although it may typically be possible to overcome this process by restricting the velocity at which the oxygenated liquid leaves the oxygenation apparatus, such an expedient may unduly limit the rate at which the oxygenated stream may be introduced into the vessel. There is thus a need for a 'single tank' method and apparatus for treating sewage or other aqueous waste material having a biochemical oxygen demand in which creating of a turbulence that prevents adequate clarification from taking place is avoided.

It is an aim of the present invention to provide a method and apparatus to meet this need.

According to the present invention there is provided a method of treating sewage or other aqueous waste material having a biochemical oxygen demand, which method comprises the steps of establishing in a tank, having a stilling chamber (and/or a like functioning arrangement of baffles) at an upper region thereof, a lower volume of sewage containing suspended aerobic micro-organisms that partake in the biological treatment of sewage, an upper volume of such sewage in the stilling chamber, and, overlying said lower volume, a volume of clarified water at least an upper portion of which surrounds the stilling chamber; withdrawing a stream of sewage from a lower region of the tank; combining the withdrawn stream with a stream of incoming sewage, and oxygenatingthe combined streams; introducing the oxygenated liquid in at least one stream into the stilling chamber and allowing the stream or streams to pass downwardly into said lower volume and into an open-topped chamber (or arrangement of baffles) so positioned with respect to the bottom of the tank and having a generally vertical wall or walls so arranged as to substantially prevent any stream of liquid deflected with a horizontal component of velocity from the bottom of the vessel passing upwardly into a region of the lower volume of sewage near to the boundary of said first volume with the volume of clarified water.

The invention also provides apparatus for treating sewage or other aqueous waste material having a biochemical oxygen demand, which apparatus comprises a tank having a stilling chamber (and/or a like functioning arrangement of baffles) at an upper region thereof, in which tank there is able to be established a lower volume of sewage containing suspended aerobic microorganisms that partake in the biological treatment of sewage, an upper volume of such sewage in the stilling chamber, and, overlying said lower volume, a volume of clarified water at least an upper portion of which surrounds the still chamber; means for withdrawing or running-off clear water from the volume of clarified water; means for withdrawing a stream of sewage from a lower region of the tank and for combining the stream with a stream of incoming sewage; an oxygenator for oxygenating the combined streams; means for introducing the oxygenated liquid in at least one stream into the stilling chamber; an open-topped chamber (or arrangement of baffles) so positioned with respect to the bottom of the tank and having a generally vertical wall or walls so arranged as substantially to prevent, in operation of the apparatus, any stream of liquid deflected with a horizontal component of velocity from the bottom of the vessel passing upwardly into a region of the lower volume of sewage near to the boundary of said first volume with the volume of clarified water.

The method and apparatus according to the invention are able to be operated such that turbulence is confined primarily to the stilling chamber and the open-topped chamber and kept away from the boundary (which may not be sharp) between the clear water and the sewage containing the aerobic bacteria. Thus water withdrawn or run-off from the tank may be kept substantially clear.

Figure 2:
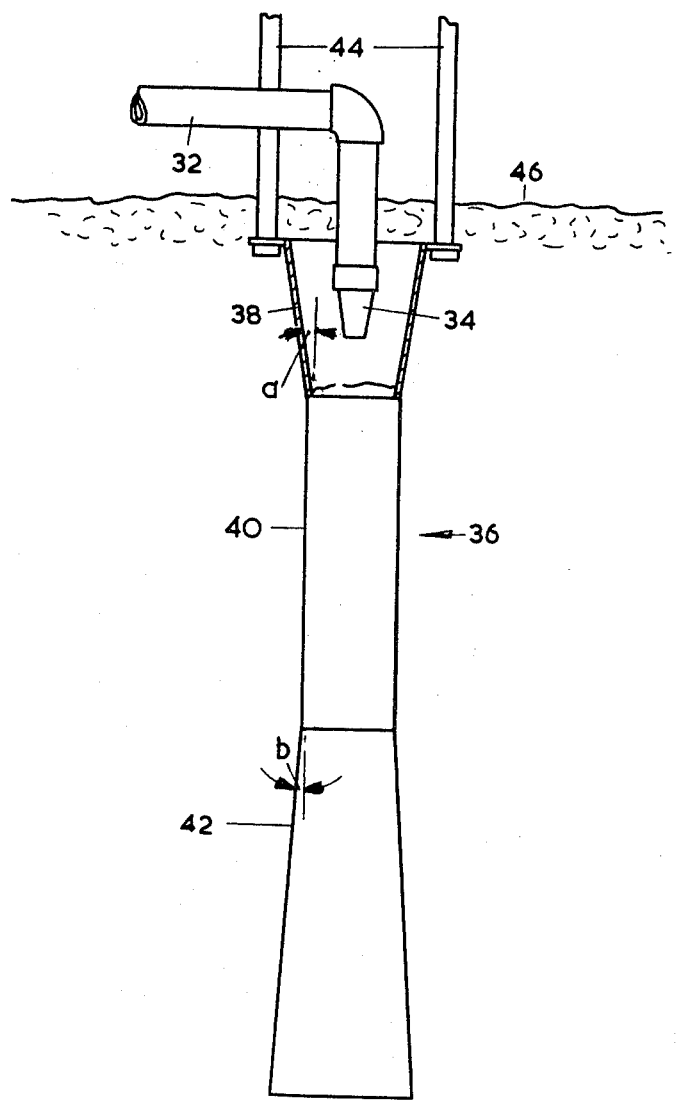

The method and apparatus according to the present invention will now be described by way of example with reference to the accompanying drawings, in which:

FIG. 1 is a schematic side elevation, partly in section, of the sewage treatment plant, and FIG. 2 is a schematic side elevation, partly in section, of part of the apparatus shown in FIG. 1.

The drawings are not to scale.

Referring to FIG. 1, a tank 2 has a floor 4 which slopes at a shallow angle inwardly towards a central well 6. Supported (by means not shown) at the top of the tank 2 is a centrally located vertically disposed, downwardly extending tubular baffle member or stilling chamber 8 having at its lower end a skirt 10 diverging in the direction of the floor 4 of the tank 2. In operation of the tank to treat biologically and clarify sewage or other aqueous effluent having a biochemical oxygen demand, an upper annular region or layer 16 of clear water is established around the baffle 8 and an upper portion of the skirt 10. In the rest of the vessel a biological (or bacterial) treatment region 14 is established in two contiguous regions 14(a) and 14(b) (the region 14(a) being defined by the baffle member 8 and skirt 10). At the top of the tank 2 is a generally circular weir 12 over which clear liquid from the layer 16 can flow and be withdrawn from the tank 2. The clear layer 16 is formed as a result of the tendency for aerobic micro-organisms in the sewage or other effluent, typically in the form of activated sludge, to settle. Typically, such activated sludge is a naturally-occuring constituent of the sewage, but, if necessary, the sewage can be seeded with activated sludge taken from a conventional municipal or other activated sludge sewage treatment process. Any heavy or coarse solids in the sewage will tend to sink to the floor 4 of the tank 2 from which they may be withdrawn from time to time through pipe 18 by opening valves 20 and, if necessary, applying suitable suction means (not shown).

Located near the bottom of the tank 2 in the biological reaction zone or region 14 are inlets to two pipes 22. Typically, the two said inlets are diametrically opposed to one another. Each pipe 22 has its own valve 24 disposed therein and ends in its own sewage pump 26. Associated with each pipe 22 is an inlet pipe 21 for incoming sewage for treatment. Each pipe 21 communicates with a region of a respective pipe 22 downstream of the valve 21 therein. A stop valve 23 is located in each pipe 21. The outlet of each pump 26 communicates with a pipeline 32 ending in a jet nozzle 34 situated within the volume of liquid confined by the baffle 8 a relatively short distance below the surface 46 of such liquid. Each pipeline 32 has a venturi 28 in it. Each venturi 28 has an inlet 30 for oxygen.

Each jet nozzle 34 is situated just inside a generally tubular open-ended chamber 36. Each chamber 36 is generally vertically disposed and situated within the volume of liquid surrounded by the baffle 8 and skirt 10. Each chamber 36 comprises an uppermost portion 38 that converges towards an intermediate, generally upright cylindrical, hollow intermediate portion 40. The portion 40 ends in a diverging decelerator portion 42, the divergence being in the direction away from the nozzle 34. Typically, the angle (a) shown in FIG. 2 is 10° and the angle (b) shown in FIG. 2 is 4°. Each chamber 36 is supported by adjustable support rods 44. The rods may be adjusted so as to submerge the top of the chamber 36 a chosen distance below the surface 46 of the liquid. Typically, this distance is in the order of 15 cm.

In operation, an aqueous suspension of activated sludge is withdrawn from a lower portion of the biological reaction region 14 and passes through the pipes 22 where it becomes mixed with incoming sewage for treatment supplied from the pipes 21. The mixture of activated sludge suspension and incoming sewage formed in each pipe 22 is then pressurised in the respective pumps 26.

Typically, the pressure is raised to a value in the range 1.5 to 4 atmospheres absolute. Each stream of pressurised liquid then flows through its respective venturi 28, such flow inducing a flow of oxygen into the liquid at a turbulent region thereof, such turbulence being created by the throat of the venturi. Bubbles of oxygen are thus formed in each pressurised stream of liquid. Some of the oxygen so introduced will dissolve, but this will generally be only a minor proportion. Typically, some 70 to 90% of the oxygen remains undissolved and is carried by the pressurised streams as undissolved bubbles. The proportion of oxygen added to the pressurised liquid may be more than the quantity required to saturate that stream with dissolved oxygen at the operating pressure.

It is important that the undissolved gas remains in the form of dispersed bubbles which do not combine to create slug flow or rise to the surface of the liquid to form a stratified gas phase, both of which of conditions will prevent the undissolved gas from being carried into the main body of liquid in the tank 2 in a form in which it can be readily dissolved or consumed therein. We have found that the velocity of each pressurised stream needs to be at or above a particular limiting value (sometimes known as the slug flow rate) in order to ensure that slug flow or stratification does not occur. This limiting value can be determined empirically for different systems and should be related to the size range of gas bubbles present.

The oxygenating gas is typically pure oxygen. If desired, however, oxygen-enriched air may be used instead. Nonetheless, it is generally desirable to keep to a minimum the amount of nitrogen or other gas mixed with the oxygen. Therefore, we prefer not to use oxygen-enriched air containing less than 65% by volume of oxygen.

The oxygenated streams of pressurised liquid pass along the pipeline 32 and enter the chambers 36 through the jet or expansion nozzles 34, each of which is generally frusto-conical in shape with its outlet being narrower than its inlet. Each nozzle ejects a liquid/gas mixture promoting mixing and causing oxygen bubbles to be reduced in size as a result of the turbulence that the jet or expansion nozzle creates.

This facilitates dissolution of the oxygen bubbles and in consequence typically about 95% of the oxygen added is dissolved upstream of the outlets of the chambers 36.

The flow of liquid/gas mixture into the convergent portion 38 of each chamber 36 induces a flow of water containing activated sludge from the volume surrounded by the baffle 8, including the liquid surface 46, into the convergent portion 38 of each chamber 36. Typically, such induced flow of liquid may be from 3 to 7 times greater than the flow rate of the pressurised liquid through the nozzles 34. Since the micro-organisms in the biological reaction or treatment region 14 respire dissolved oxygen, the dissolved oxygen concentration in the induced flow of liquid will be considerably less than that in the oxygenated, pressurised streams introduced into the chambers 36 through the nozzles 34. Consequently, a proportion of the undissolved bubbles of oxygen entering the right cylindrical portion 40 of each chamber 36 dissolve before they reach the lowermost divergent section 42. Thus, the rate of adding oxygen to the venturies 28 can be chosen to be well in excess of that required to saturate the pressurised streams without a large proportion of it remaining undissolved after leaving the chambers 36.

The upright cylindrical portion 40 of each chamber 36 is typically 2 to 3 times longer than the convergent portion 38 so as to ensure that the induced flow of liquid is thoroughly mixed with the liquid introduced into each chamber through its nozzle 34. The divergent portion 42 is adapted to decelerate the mixed stream of liquid passing through the chamber 36. Typically, the portion 42 is longer than the portion 40. Typically, the stream or jet of liquid issuing from each nozzle 34 may have a velocity in the order of 3 to 12 meters per second and the liquid leaving the outlet end of the decelerator portion 42 of each chamber 36 a velocity in the order of 0.75 meters per second and generally less than 1 meter per second. This exit velocity is in excess of the terminal bubble rise velocity.

Thus, undissolved bubbles of oxygen do not have sufficient bouyancy to rise against the downward flow of liquid through the chambers 36 and are therefore swept out of the chambers with the liquid emanating therefrom. Typically up to 5% by volume of the oxygen added through the inlets 30 may remain undissolved.

The purpose of oxygenating the liquid in the biological reaction zone 14 is to meet the respiration needs of the micro-organisms in the activated sludge that break down offensive organic pollutants in the incoming sewage. The overall requirements of the sewage for oxygen can be measured in terms of its biochemical oxygen demand and the rate of oxygenation may be chosen so as to satisfy this demand by maintaining positive concentrations of dissolved oxygen within the reaction zone or region 14.

In order for the biological treatment to take place adequately it is desirable to maintain the activated sludge in suspension in a relatively large proportion of the volume within the tank 2. In other words, the volume 16 of clear liquid in the vessel will be limited. It is thus desirable to provide in the vessel or tank 2 a degree of circulation of liquid without of course preventing adequate clarification from taking place. The streams of liquid leaving the chambers 36 are able to provide such circulation below the skirt 10. This happens because such streams of liquid tend to be reflected off the floor 4 of the tank 2 back up towards the volume surrounded by the skirt 10.

In order to confine such circulation or turbulence to parts of the region 14(b) relatively remote from the boundary between the region 14(b) and the layer 16 of clear water thereabove, a generally vertically-disposed, open-topped chamber 52 is seated on the floor 4 of the tank 2 and extends upwardly through the region 14(b) into the region 14(a), terminating below the chambers 36 but extending into the volume within the skirt 10. The chamber 52 is coaxial with the baffle member or chamber 8 and skirt 10. It is, however, narrower than the chamber 8 having a mouth which is wider than is required for the purpose of receiving the streams of liquid leaving the chambers 36. The chamber 52 may be generally tubular or cuboid in shape. In operation, most of the liquid issuing and then passing generally vertically downwards from the chambers 36 is deflected generally vertically upwards. In practice, we have found that there is, however, some liquid that is deflected upwards but with an appreciable horizontal component of velocity that would, were it not for the vertical wall or walls 54 of the chamber 52, carry the liquid upwards to the boundary of the layer 14(b) with the layer 16 of clarified water. Since such liquid contains suspended solids, if it were to reach such boundary, it would tend to cause suspended solid to be carried into the clear water, thus rendering the clarification inadequate. However, the vertical wall or walls 54 of the chamber 52 provide a barrier or baffle preventing deflection of liquid to such boundary by deflecting liquid travelling in the direction of the boundary into the region 14(a). There is thus no disturbance to the clarification of the sewage as a result of deflection of liquid from the bottom of the tank 2.

There is considerable turbulence in the region 14(a) as a result of flow of sewage into and out of the chambers 36 and passages of liquid into the region 14(a) after deflection from the bottom 4 of the tank 2. There is thus some downward passage of liquid from the region 14(a) into parts of the region 14(b) outside the open-topped chamber 52 but this downward passage does not disturb clarification of the sewage.

There is also a pronounced flow of liquid from the upper region of the liquid within the baffle 8 into the mixing chambers 36. This helps to cause the necessary circulation or movement of liquid within the volume of liquid kept separate from the clear liquid by the baffle 8 and its skirt 10. The above-described circulation of liquid in both in an upper part and a lower part of the vessel helps to maintain an adequate distribution of activated sludge throughout the biological treatment region 14.

Preferably, the chambers 36 are located towards the centre of the volume surrounded by the baffle 8 and its skirt 10 and well away from such baffle and skirt. This is so as to ensure that no substantially undissolved bubbles leaving the chambers 36 are carried into regions of the vessel 2 from where they subsequently rise into the volume 16 of clear liquid. Solid particles of sludge can adhere to the bubbles and be lifted to the surface of the liquid in the tank 2 thereby. We prefer to ensure that any such particles of sludge, or fat, that rise to the surface in this way are kept within the baffle means 8. In this respect, the skirt 10 collects any bubbles rising from parts of the region 14(b) outside the chamber 52 and guides them into the volume surrounded by the baffle 8. Any such solids or fat rising to the surface will tend to be distilled therefrom by the circulation created by the action of the jets of liquid leaving the nozzles 34 and inducing flow of liquid into the chambers 36 from the surface of the liquid 46.

Typically, in operation, there is a continuous flow of sewage into the illustrated plant through the pipes 21 and a continuous clarification of the liquid. Thus, clear liquid will overflow the weir 12 substantially continuously and can be discharged to the environment or treated further.

It is not necessary for the oxygenation to be continuous. If desired, a dissolved oxygen meter may be located within the biological treatment region 14 at a location which is not directly impinged upon by the streams of liquid leaving the chambers 36, and oxygen introduced once the sensed dissolved oxygen concentration falls below a chosen level (say 1 ppm) the oxygenation may be continued until the level of dissolved oxygen has been restored to say 3 ppm. Typically, such introduction of oxygen may be controlled automatically by arranging for the dissolved oxygen meter to generate signals effective to open or close, as appropriate, an automatic (say solenoid operated) valve (not shown) in each oxygen pipe 30.

Typically, at least one of the pressurised streams of sewage and liquid containing suspended sludge is passed into the reaction zone or region 14 through the nozzle 34 and chamber 36 continuously. If desired, the other such stream may be passed only during periods when oxygen is being added. Thus, the dissolved oxygen meter may be arranged to generate a signal which switches off one of the pumps 26 at the same time as closing the valves (not shown) in the oxygen pipes 30.

The rate of recycling liquid from the reaction zone 30 is typically chosen to be many times greater than the rate at which incoming sewage is mixed therewith. The relative rate of recycle generally required will depend on the biochemical oxygen demand of the incoming sewage. Generally, the greater the biochemical oxygen demand, the greater needs to be the ratio of the rate of recycle to the rate of inflow of sewage for treatment. Typically, the ratio may be in the order of 10 to 20:1. It must be borne in mind, however, that the oxygen that can be added to the recycle streams can be sufficient not only to obtain good levels of dissolved oxygen in such stream but also to oxygenate the liquid induced into the chambers 36 by the action of the jets 34. Thus, the effective recycle rate will be greater.

If desired, there may be more than two mixing chambers 36 and associated nozzles 34. For example, there may be four such chambers and nozzles arranged in two rows of two.

We claim:

1. A method of treating sewage or other aqueous waste material having a biochemical oxygen demand, which method comprises the steps of establishing in a tank, in which a stilling chamber having a diverging skirt at the lower edge thereof, is disposed in an upper region of the tank, a lower volume of sewage containing suspended aerobic micro-organisms that partake in the biological treatment of sewage, an upper volume of such sewage in the stilling chamber, and, overlying said lower volume, a volume of clarified water at least an upper portion of which surrounds the stilling chamber; withdrawing clear water from the volume of clarified water; withdrawing a stream of sewage from a lower region of the tank; combining the withdrawn stream of sewage with a stream of incoming sewage, and oxygenating the combined streams; passing the oxygenated liquid through an expansion nozzle into the stilling chamber and allowing such stream to pass downwardly into said lower volume and into an open-topped chamber extending from at or near the bottom of the tank into the stilling chamber, with the open-topped chamber so positioned below the stilling chamber and with respect to the bottom of the tank, and having generally vertical walls so arranged to substantially prevent any stream of liquid deflected with a horizontal component of velocity from the bottom of the vessel passing upwardly into a region of the lower volume of sewage near to the boundary of said lower volume with the volume of clarified water.

2. Apparatus for treating sewage or other aqueous waste material having a biochemical oxygen demand, which apparatus comprises a tank having a tank having a stilling chamber having a diverging skirt at the lower edge thereof disposed in an upper region of the tank, in which there is able to be established a lower volume of sewage containing suspended aerobic micro-organisms that partake in the biological treatment of sewage, an upper volume of such sewage in the stilling chamber, and, overlying said lower volume, a volume of clarified water at least an upper portion of which surrounds the stilling chamber; means for withdrawing clear water from the volume of clarified water; means for withdrawing a stream of sewage from a lower region of the tank and means for combining said stream of sewage with a stream of incoming sewage; an oxygenator fluidly connected for oxygenating the combined streams; expansion nozzle means for introducing the oxygenated liquid in at least one stream into the stilling chamber; an open-topped chamber located below the stilling chamber and extending from at or near the bottom of the tank into the stilling chamber, and being so positioned with respect to the bottom of the tank, and having generally vertical walls disposed so as to substantially prevent any stream of liquid deflected with a horizontal component of velocity from the bottom of the tank passing upwardly into a region of the lower volume of sewage near to the boundary of said lower volume with the volume of clarified water.

* * * * *